A. H. Knapp.
Spring for Bed-Bottoms, Chairs, &c.
N° 73905. Patented Jan. 28, 1868.
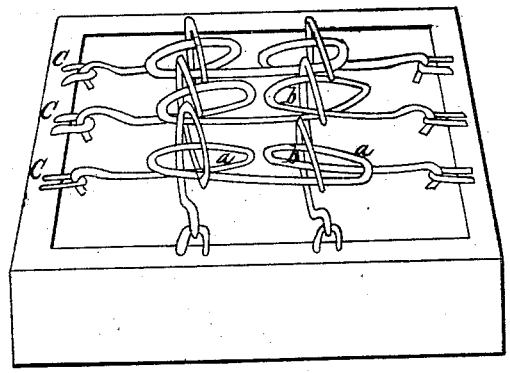
Witnesses.
L. W. Warren
E. E. Harrington
Inventor.
A. H. Knapp.

United States Patent Office.

A. H. KNAPP, OF NEWTON CENTRE, MASSACHUSETTS.

Letters Patent No. 73,905, dated January 28, 1868.

IMPROVED SPRING FOR BED-BOTTOMS, CHAIRS, &c.

The Schedule referred to in these Letters Patent and making part of the same.

TO ALL WHOM IT MAY CONCERN:

Be it known that I, A. H. KNAPP, of Newton Centre, in the county of Middlesex, and State of Massachusetts, have invented a new and useful Improvement in Upholstering-Springs; and I do hereby declare that the following is a full, clear, and exact description of the construction and operation of the same, reference being had to the accompanying drawing, forming a part of this specification, which is a plan, showing the manner of arranging the wires to form a spring-bottom for beds, chairs, settees, sofas, &c.

The principal advantages secured by its use are, durability of articles so made, and health and comfort while using them.

My invention consists in forming springs by bending wires into a succession of triangular or oblong loops, a a, about an inch apart, or varying with the size of the wire, but of a uniform distance apart, as shown in the drawings. The loops of the wires passing either lengthwise or crosswise should be made a little the smallest, so as to pass through and rest inside of the ones crossing them, as shown at b b; or the loops may be alternately large and small, and woven together, so as to rest alternately inside of and around each other, the ends of each spring being fastened in any obvious manner to the frame it is designed to be used upon, as shown at C C C, giving sufficient tension to each wire to keep the loops in place.

The fineness of the wires with which they can be constructed, and consequently the nearness with which they can be placed to each other, and the light pressure with which each spring will yield to and adapt itself to the inequalities of the system, make them very comfortable to lie upon; and the little amount of covering required on a bed-bottom constructed with these springs makes them very cool and comfortable in warm weather. The peculiar shape in which the loops are bent causes the bottoms constructed of them to resume a rounded and oval shape whenever released from pressure.

What I claim as my invention, and desire to secure by Letters Patent, is—

The wire springs b b, constructed by bending the same into a succession of loops, as shown in the accompanying drawings, to be used in constructing the bottoms of beds, chairs, settees, sofas, and lounges.

A. H. KNAPP. [L. S.]

Witnesses:
L. W. WARREN,
E. C. HARRINGTON.